Feb. 6, 1923.
W. B. CROOKS
AUTOMOBILE MIRROR
Filed Sept. 13, 1921
1,444,538
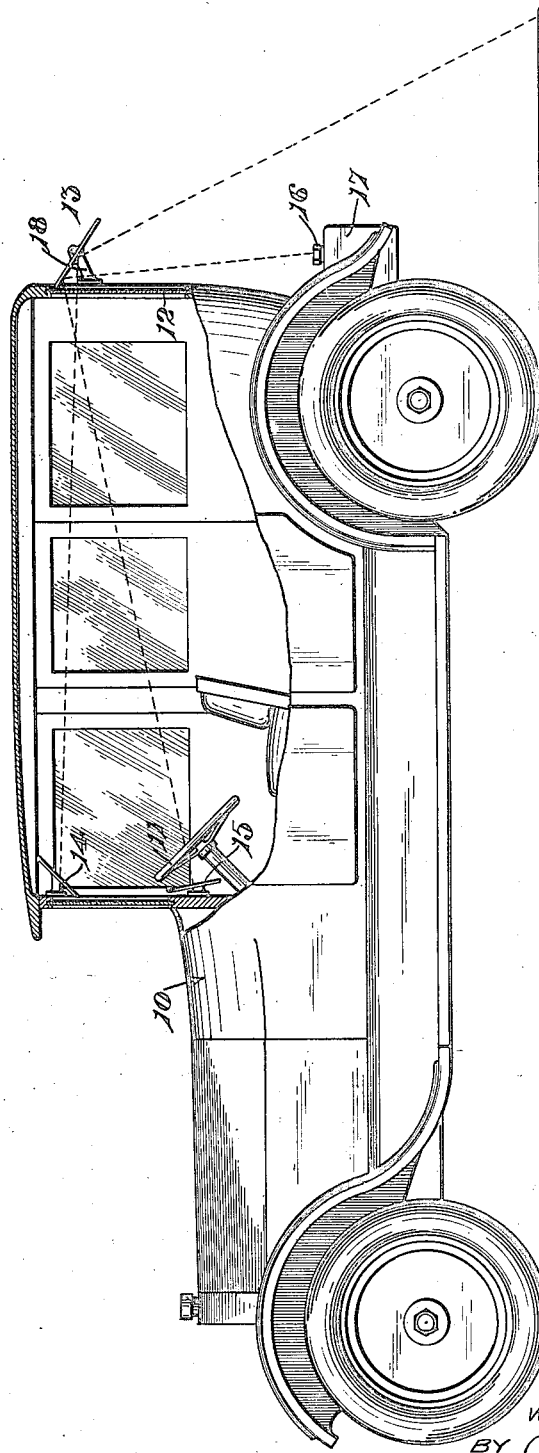
INVENTOR.
WALTER B. CROOKS.
BY Chas. E. Townsend
ATTORNEY.

Patented Feb. 6, 1923.

1,444,538

UNITED STATES PATENT OFFICE.

WALTER B. CROOKS, OF BENICIA, CALIFORNIA.

AUTOMOBILE MIRROR.

Application filed September 13, 1921. Serial No. 500,449.

*To all whom it may concern:*

Be it known that I, WALTER B. CROOKS, a citizen of the United States, residing at Benicia, in the county of Solano and State of California, have invented new and useful Improvements in Automobile Mirrors, of which the following is a specification.

This invention relates to an automobile and particularly pertains to a rear sight mirror therefor.

In driving automobiles and particularly when using the same in cities, it is found to be very inconvenient to back an automobile up to a position along a curb, as it is practically impossible to ascertain the position of other vehicles which might be in the rear of the backing car.

It is the object of the present invention to provide a system of mirrors by which the space in the rear of a car may be observed by the driver without difficulty, said device being further equipped with means for observing the gasoline gauge on a rear fuel tank.

The invention is illustrated by way of example in the accompanying drawing in which the figure is a view in side elevation showing an automobile with parts broken away and the invention applied thereto.

In the accompanying drawing 10 indicates an automobile of the closed body type, having the usual front and rear seat and steering wheel 11. The back of the body is formed with a rear window 12 through which the driver may view the roadway in the rear of the machine by turning. This does not permit him, however, to view the roadway directly behind the car, and for that purpose a reflecting mirror 13 is mounted in the rear of the window 12. Light rays from this mirror are projected forwardly onto a mirror 14 which is secured at the forward end of the vehicle body and in direct view of the driver while facing forwardly. A second mirror 15 is secured to the dashboard of the car and is so arranged relatively to the mirror 13, that the driver may at all times have a full view of the liquid gauge 16 on the gasoline tank 17. The mirror 13 is adjustably supported upon the bracket 18. Attention is directed to the fact that the disposition of the mirror 13 in the rear of and above the window 12 will act as a shelter for this window and prevent the direct rays of the sunlight from passing into the car unless the sun is quite low.

In operation of the present invention the mirrors 13, 14 and 15 are properly adjusted so that the driver may obtain a vision of the roadway directly in the rear of the car as he looks into the mirror 14, and a view of the liquid gauge 16 from the mirror 15. It will thus be evident that as the car is backed the roadway to be directly traversed may be observed and accidents readily avoided.

While I have shown the preferred form of my invention, it is to be understood that various changes may be made by those skilled in the art without departing from the spirit of the invention.

Having thus described my invention, what I claim and desire to secure by Letters Patent is:

1. In combination with an automobile, the body of which is formed with a rear window; a reflecting mirror secured to said body at the outside and the top of said window; a second mirror at the forward end of the body and in reflective position relative to the rear mirror whereby a forward glance on the part of the driver of the vehicle will permit him to observe the rear of the car and the immediate roadway in the forward mirror; means for adjustably supporting said mirrors; and a third mirror in reflective position relative to the rear mirror in a manner to permit the driver of the car to observe the liquid gauge on the gasoline tank.

2. In combination with an automobile, the body of which is formed with a rear window, of a reflecting mirror secured at the outside of said body at the top of said window, a second mirror at the forward end of the body and in reflective position relative to the rear mirror whereby a forward glance on the part of the driver of the vehicle will permit him to observe the roadway immediately in the rear of the vehicle, in the forward mirror; and a second mirror located at the front of the body above the second named mirror and in reflective position relative to the mirror at the rear of the car whereby a forward and upward glance on the part of the driver of the vehicle will permit him to observe the rear of the vehicle, including the gasoline tank and its gauge.

WALTER B. CROOKS.